(12) United States Patent
Blackert et al.

(10) Patent No.: US 12,311,383 B2
(45) Date of Patent: May 27, 2025

(54) PROCESS FOR PRODUCING SCRAP MATERIALS WITH HIGH PURITY LEVEL FROM INHOMOGENEOUS INPUT MATERIAL

(71) Applicant: TSR Group GmbH & Co. KG., Luenen (DE)

(72) Inventors: Christian Blackert, Willich (DE); Aron Bruemmer, Duisburg (DE)

(73) Assignee: TSR Group GmbH & Co. KG., Luenen (DE)

( * ) Notice: Subject to any disclaimer, the term of this patent is extended or adjusted under 35 U.S.C. 154(b) by 0 days.

(21) Appl. No.: 18/571,959

(22) PCT Filed: Jul. 8, 2022

(86) PCT No.: PCT/EP2022/069050
§ 371 (c)(1),
(2) Date: Dec. 19, 2023

(87) PCT Pub. No.: WO2023/285302
PCT Pub. Date: Jan. 19, 2023

(65) Prior Publication Data
US 2024/0316570 A1   Sep. 26, 2024

(30) Foreign Application Priority Data

Jul. 13, 2021   (DE) .......................... 102021118108.9

(51) Int. Cl.
*B03B 9/06*    (2006.01)
*B02C 13/284*  (2006.01)
(Continued)

(52) U.S. Cl.
CPC ................ *B03B 9/061* (2013.01); *B09B 3/35* (2022.01)

(58) Field of Classification Search
CPC ..... B02C 23/08; B02C 23/10; B02C 19/0062; B02C 18/0084; B02C 18/0092; B02C 25/00; B02C 2201/06; B03B 9/061
See application file for complete search history.

(56) References Cited

U.S. PATENT DOCUMENTS

| | | |
|---|---|---|
| 4,798,345 A | 1/1989 | Adolph |
| 4,848,590 A | 7/1989 | Kelly |

(Continued)

FOREIGN PATENT DOCUMENTS

| | | |
|---|---|---|
| CN | 101670355 A | 3/2010 |
| CN | 104624519 A | 5/2015 |

(Continued)

OTHER PUBLICATIONS

English Translation of International Search Report, Mailed Oct. 31, 2022, issued in corresponding PCT Patent Application No. PCT/EP2022/069050, Filed Jul. 8, 2022.

(Continued)

*Primary Examiner* — Mohammed S. Alawadi
(74) *Attorney, Agent, or Firm* — PERRY + CURRIER INC.

(57) ABSTRACT

The invention relates to a method for producing recycled scrap, said method comprising the following steps: a) preparing or providing an inhomogeneous, ferrous scrap composition; b) comminuting the inhomogeneous, ferrous scrap composition in a comminution unit in order to obtain a comminuted material; c) separating organic and/or inorganic impurities from the comminuted material in order to obtain a pre-cleaned material; d) analysing the pre-cleaned material with one or more first detection devices in order to detect at least a first item of material information and separating out constituents of the pre-cleaned material in order to obtain a purified material, wherein the separation is performed depending on the first item of material information; and e)

(Continued)

analysing the purified material with one or more second detection devices in order to detect at least one second item of material information; f) matching the detected second item of material information with a predefined material criterion associated with the second item of material information, wherein the purified material is output as recycled scrap if the second item of material information fulfils the associated predefined material criterion.

9 Claims, 1 Drawing Sheet

(51) Int. Cl.
  *B02C 13/286* (2006.01)
  *B09B 3/35* (2022.01)

(56) References Cited

U.S. PATENT DOCUMENTS

| | | |
|---|---|---|
| 6,266,390 B1 | 7/2001 | Sommer, Jr. et al. |
| 6,519,315 B2 | 2/2003 | Sommer, Jr. et al. |
| 2003/0038194 A1 | 2/2003 | Van Der Beek et al. |
| 2003/0215260 A1 | 11/2003 | Morii et al. |
| 2008/0257794 A1 | 10/2008 | Valerio |
| 2008/0257795 A1 | 10/2008 | Shuttleworth |
| 2009/0236268 A1 | 9/2009 | Shulman |
| 2010/0017020 A1 | 1/2010 | Hubbard-Nelson et al. |
| 2011/0266377 A1* | 11/2011 | Lindner ............... B03B 5/28 241/24.1 |
| 2012/0111977 A1 | 5/2012 | Shuttleworth et al. |
| 2012/0174369 A1 | 7/2012 | Ming et al. |
| 2013/0134076 A1 | 5/2013 | Box et al. |
| 2014/0231314 A1 | 8/2014 | Pillkahn |
| 2017/0014868 A1 | 1/2017 | Garcia, Jr. et al. |
| 2018/0243800 A1 | 8/2018 | Kumar et al. |
| 2019/0046992 A1 | 2/2019 | Primavera et al. |
| 2020/0261952 A1* | 8/2020 | Murata ............... B09B 3/00 |
| 2020/0368786 A1 | 11/2020 | Kumar et al. |

FOREIGN PATENT DOCUMENTS

| | | |
|---|---|---|
| CN | 113019575 A | 6/2021 |
| DE | 3146049 A1 | 8/1982 |
| DE | 3234298 A1 | 3/1984 |
| DE | 3643529 C1 | 3/1988 |
| DE | 4016295 A1 | 11/1991 |
| DE | 4317288 C2 | 5/1995 |
| DE | 4317287 C2 | 2/1997 |
| DE | 19949656 A | 4/2001 |
| DE | 69816070 T2 | 6/2004 |
| DE | 102004041494 A1 | 3/2006 |
| DE | 102006034692 A1 | 1/2008 |
| DE | 202009006383 U1 | 8/2009 |
| DE | 102009056813 A1 | 6/2011 |
| DE | 102012203333 A1 | 9/2013 |
| DE | 112017005252 B4 | 3/2024 |
| EP | 0103778 A2 | 3/1984 |
| EP | 0254173 A2 | 1/1988 |
| EP | 0979677 B1 | 7/2003 |
| EP | 1721674 A1 | 11/2006 |
| EP | 2633916 A2 | 9/2013 |
| EP | 2716774 A1 | 4/2014 |
| EP | 2823945 A2 | 1/2015 |
| FR | 2497234 A1 | 7/1982 |
| GB | 2186504 A | 8/1987 |
| JP | 2002210417 A | 7/2002 |
| JP | 2002348606 A | 12/2002 |
| KR | 20140048626 A | 4/2014 |
| WO | WO-2006041281 A2 | 4/2006 |
| WO | WO-2009123701 A2 | 10/2009 |
| WO | WO-2011011523 A1 | 1/2011 |
| WO | WO-2013163759 A1 | 11/2013 |
| WO | WO-2018218358 A1 | 12/2018 |

OTHER PUBLICATIONS

Dubbel, Taschenbuch fur den Maschinenbau, 24. Auflage, Springer Verlag 2014, Seiten S 124-132 with English summary.

BDSV, "Europaische Stahlschrottsortenliste" in der Fassung vom, Federal Association of German Steel Recycling and Disposal Companies, e.V., Jun., 1 1995, with English translation—"European steel scrap grade list".

Russo et al., "X-traction of copper from shredder scrap by means of TITECH XRF-sensor based sorting technology", Budapest, Mar. 24, 2011, ArcelorMittal.

IARC, Program of Budapest congress—11th International Automobile Recycling Congress IARC 2011, IARC, Mar. 23-25, 2011, Budapest, Hungary.

Ecoscan, Realtime Analysis of Shredded Scrap and NF-Metals, Jun. 1, 2018, Ecoscan.

Gyllenram,R. et al., "Not only the iron content, how scrap upgrading and ore benefication affect the value of scrap and DRI. PowerPoint presentation" at AIST Scrap Supplements And Alternative Ironmaking 8, Orlando, USA, Mar. 2-4, 2020.

Hitachi, "How an increasedffi use of scrap metal can affect your quality control", vom 21. Jan. 2020, hha.hitachi-hightech.com, Available at URL: https://hha.hitachi-hightech.com/de/blogs- events/ blogs/2020/01/21/wie-sichein-erhohter-einsatz-von- altmetall-auf-ihre-qualitatskontrolle-auswirkV, German language with English translation.

Metso Minerals, "Power Zerdirator ZK 250 x 260-6000 PS" 2007, Metso Lindemann GmbH, with English translation.

Metso Minerals, "Metso Lindemann Kondirator ZK 210 x 260, Maschinennummer 58009M (teilweise qeschwarzt)", Metso Lindemann Gmbh, 2003 with English translation.

Sicon, "Shredding & Ferrous Downstream—Product Overview", SICON, Jun. 2021.

Thome-Kozmiensky, Karl J., et al., "Recycling und Rohstoffe—Band 7", TK, 2014, pp. 471-482 with English translation—"Recycling and raw materials".

Steinert, "Magnetic separation & sensor-based sorting from a single source", product brochure by Steinert GmbH, Aug. 2020.

McKenna, Profit Center in the journal Recycling Today, Mar. 2014, pp. 189-196.

Global Recycling, "Analyzing Shredded Scrap with Sicon's EcoScan Online", global-recycling.info, Mar. 2018, 4e Volume pp. 36-37.

Satlow, Christian Dr.Ing, "The future of scrap as a raw material-processing, quality, recycling mangement" , 2018, Theo Steil GmbH, Tier German language with English translation.

Gao, Zhijiang et al., "Applying Improved Optical Recognition with Machine Learning an Sorting Cu Impurities in Steel Scrap", Taylor; Journal of Sustainable Metallurgy (2020) 6:785-795.

SICON, "Shredding & Ferrous Downstream, Product Overview", Jun. 2021, SICON Germany GmbH, Vordere Insbach 24-26, 57271 Hilchenbach, Germany.

Global Recycling, "Analyzing Shredded Scrap with Sicon's Ecoscan Online", global-recycling.info, Mar. 2018, vol. 4, ISSN-Print 2365-7928, pp. 36-37.

Nadolski, Stefan, et al. "Evaluation of bulk and particle sensor-based sorting systems for the New Afton block caving operation." Minerals Engineering 121 (2018): 169-179.

Gundupalli, Sathish Paulraj et al., "A review on automated sorting of source-separated municipal solid waste for recycling." Waste management 60 (2017): 56-74.

Daehn, Katrin E. et al. "Finding the most efficient way to remove residual copper from steel scrap." Metallurgical and Materials Transactions B 50 (2019): 1225-1240.

Eu-Recycling, "Sicon EcoScan Online" eu-recycling.com, Dec. 2018, URL: https://eu-recycling.com/Archive/21875, with English translation.

Kolking, Max et al, "Characterization of Metal Scrap by Multisensor Systems", Recycling und Sekundarrohstoffe—Band 13 (2020), Seiten 424-443.

Eur Lex, Official Journal of the European Union L 94/2 (EU-Verordnung) Council Regulation (EU) No. 333/2011, Mar. 31, 2011, EUR-Lex with English translation.

(56) References Cited

OTHER PUBLICATIONS

EUR Lex, Official Journal of the European Union L 201/14 (EU-Verordnung) Commission Regulation (EU) No. 715/2013, Jul. 25, 2013, EUR-Lex with English translation.

Zenrobotics, "ZenRobotics Case Carl F—Recycling robots ensure efficient waste sorting" Youtube.com, Jan. 9, 2020, Available at URL:https://www.youtube.com/watch?v=Wwu8HVtWw30&t=1s includes transcript of video.

Steinert, "Building a world class scrap recycling plant with Steinert technologies" Youtube.com, Aug. 20, 2020, Available at URL: https://www.youtube.com/watch?v=gw5mgHslAjs includes transcript of video.

\* cited by examiner

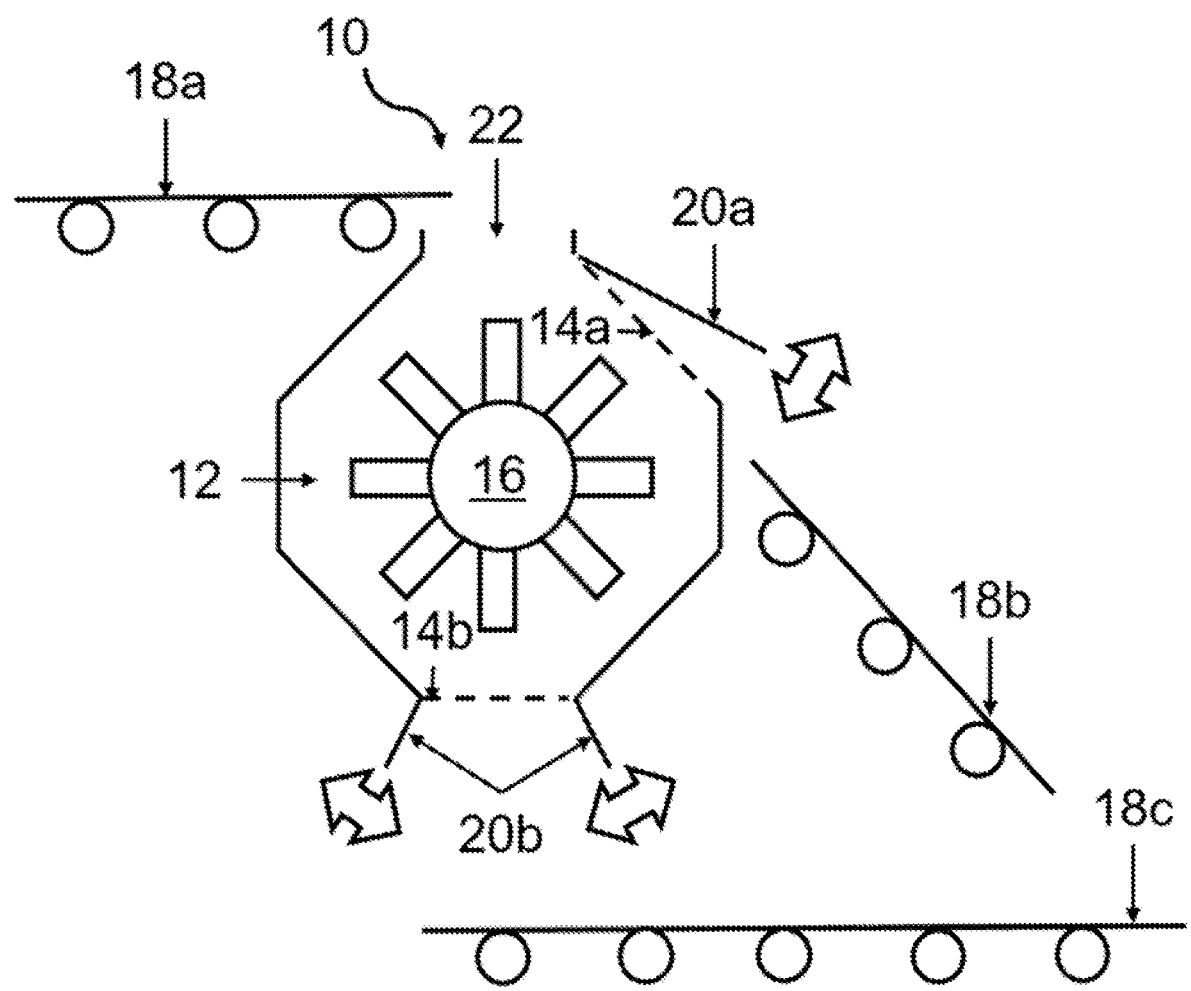

PROCESS FOR PRODUCING SCRAP MATERIALS WITH HIGH PURITY LEVEL FROM INHOMOGENEOUS INPUT MATERIAL

The invention relates to a process for producing recycled scrap, a recycled scrap having a particularly high iron content producible by this process, to a plant for recycling scrap which is optimized for performing the process and to an improved comminuting unit for use in corresponding processes and plants.

The subject matter of the invention is defined herein in the appended claims.

The valuable substance scrap is obtained by scrapping end-of-life metallic articles. Especially iron and steel scrap have long been seen not only as a waste but also as an important secondary raw material which may be employed in numerous applications to reduce the need for newly produced metals. The use of scrap as raw material not only reduces the dependence of industry on scarce raw materials and reduces the amount of otherwise unnecessary refuse. The reduced demand for newly obtained metals and alloys whose large industrial scale production is generally associated with a considerable need for energy and other resources also allows for a more sustainable economy.

Especially in the field of producing products for high-performance applications particularly high demands are placed on iron-containing scraps. If scraps are to be employed instead of newly obtained metals these must reliably have material properties that are at least similar to those of newly recovered metals.

There is therefore in principle a great need for many industrial applications to obtain particularly pure scrap compositions which ideally also have an advantageous poured density.

However, this is well known to be a very challenging objective since the starting materials for the production of corresponding scrap compositions are inherently heterogeneous, wherein for example two scrapped washing machines from different manufacturers may result in scraps of different constitutions despite the similarity of the products.

To obtain corresponding pure scrap compositions the prior art discloses various, usually very complex processes which may in principle extend to manual sorting processes which merely comprise workers isolating particularly suitable fractions of a scrap composition.

Operators of large industrial scale shredding plants often realize production of comparatively pure scrap compositions in practice by passing the processed scraps through the treatment plant and the shredder repeatedly, i.e. the scraps are supplied to two or more comminution steps, optionally with a downstream sorting operation to realize improved purities and/or more advantageous poured densities in the material.

The processes known from the prior art have the disadvantage that they are comparatively time- and/or cost-intensive, for example since they necessitate twofold processing of the materials, thus increasing rejection and at least halving the material throughput of the plant. In addition, in this procedure material may remain in the plant in the first pass which only arrives at the withdrawal point during the second pass through the plant so that the obtained material at the outlet may regularly contain fractions which have not even undergone the necessary twofold shredding step.

In addition the prior art processes often have the disadvantage that there are relatively few data about the obtained product. This is problematic since for many high-performance applications it is often insufficient merely to provide scrap having a particular quality but rather it is essential for many applications also to be able to reliably demonstrate this quality, for example for reasons of liability.

It is also often difficult in the processes known from the prior art to actively control the product quality during operation of the process in order for example to adapt this to customer demands as rapidly as possible. It is therefore often impossible in the processes known from the prior art to produce for example two different scrap products having different specifications in immediate succession in continuous operation and/or without refitting the plant.

In conventional processes it is often also impossible to produce high poured densities advantageous for certain applications within a production time that allows efficient large industrial scale product production.

It was the primary object of the present invention to specify an improved process for producing recycled scrap which makes it possible to overcome or at least reduce the disadvantages known from the prior art.

It was accordingly an object of the present invention to provide an improved process for producing recycled scrap in high quality and with a high poured density which makes it possible to obtain from the customary scrap fractions, i.e. an inhomogeneous and particularly challenging starting material, a particularly pure scrap product having a particularly advantageous poured density.

It was an object of the present invention to specify a process for producing recycled scrap which makes it possible to produce correspondingly high-quality products ideally already in one pass so that the time- and cost-efficient process should be particularly employable for large industrial scale production of these high-quality scrap products in large amounts and at a low cost.

Compared to the prior art the process to be specified for producing recycled scrap should especially also make it possible to achieve a substantially higher purity at industrially relevant volumes than has been possible with the processes to date.

It was a supplementary requirement that the process to be specified for producing recycled scrap should be able to be operated with conventional scrap fractions as starting material and that this should be operable as far as possible with equipment already available in conventional scrap processing plants.

It was a supplementary object of the present invention that the process to be specified for producing recycled scrap should be configured such that it should automatically afford more comprehensive information about the properties of the scrap batches produced in each case.

In addition the process to be specified for producing recycled scrap should be highly flexible and easily adaptable, thus making it particularly efficiently adaptable to changing quality requirements from the customer, ideally even in ongoing operation. In this respect it was a supplementary object of the present invention that the process to be specified for producing recycled scrap makes it possible to flexibly adapt the chemical composition and/or the particle shape and/or the poured density of the recycled material.

It was also desirable that the process to be specified for producing recycled scrap should especially also reduce the risk of non-conforming scrap batches that are unusable by the customer.

It was an additional object of the present invention that the process to be specified for producing recycled scrap should be operable particularly safely and with low emissions to reduce the risks and contamination to humans and the environment.

It was moreover a secondary object of the present invention to specify a recycled scrap which is a high-quality scrap product that is also suitable for high-performance applications.

It was additionally a secondary object of the present invention to specify an improved plant for recycling scrap and a novel comminuting unit, each of which should be particularly optimized for use in the process to be specified.

The inventors of the present invention have developed a novel and powerful process and the accompanying plants which make it possible to achieve the abovementioned objects. In simplified summary this process is based on a comprehensive modification of existing process technology, with the focus especially on specific coupling of separation technology with process analytics.

The process according to the invention makes it possible, to the knowledge of the inventors for the first time, to produce a high-quality scrap product in industrially relevant amounts in a time- and cost-efficient manner in a single pass. Despite the use of inhomogeneous starting materials, i.e. the customary scrap fractions, it is possible to achieve iron contents of 97% or more, virtual freedom from organic impurities and advantageous poured densities which, to the knowledge of the inventors, were not achievable with comparable prior art large industrial scale processes, at least not with comparable material throughput and/or with comparable reproducibility. As a synergistic advantage the material information obtained in the course of workup may also be used to document material constitution, thus allowing certification of the produced scrap products at little additional effort.

In experiments undertaken by the inventors it was possible to obtain on a large industrial scale recycled scraps having an iron content of more than 97% and, through the use of a preferred plant according to the invention, poured densities of about 1.5 t/m$^3$ with virtually spherical particles.

The abovementioned objects are thus achieved by a process for producing recycled scrap, the scrap producible therewith, plants for recycling scrap and comminuting units in the claims.

Features of inventive embodiments that are hereinbelow described as preferred are in particularly preferred embodiments combined with other features described as preferred. Very particular preference is therefore given to combinations of two or more of the embodiments described as particularly preferred hereinbelow. Likewise preferred are embodiments in which a feature described as preferred to any extent is combined with one or more further features described as preferred to any extent. Features of preferred recycled scraps, preferred plants for recycling scrap and preferred comminuting units are apparent from the features of preferred processes.

The invention relates to a process for producing recycled scrap comprising the steps of:
a) producing or providing an inhomogeneous iron-containing scrap composition,
b) comminuting the inhomogeneous, iron-containing scrap composition in a comminuting unit to obtain a comminuted material,
c) separating organic and/or inorganic impurities from the crushed material in order to obtain a pre-purified material,
d) analyzing the pre-purified material with one or more first detection apparatuses for detecting at least a first piece of material information and segregating constituents of the pre-purified material to obtain a purified material, wherein the segregating is carried out according to the first piece of material information, and
e) analyzing the purified material with one or more second detection apparatuses for detecting at least a second piece of material information,
f) comparing the detected second piece of material information with a predetermined material criterion assigned to the second piece of material information, wherein the purified material is output as recycled scrap when the second piece of material information meets the assigned predetermined material criterion.

The process according to the invention is in principle also suitable for small scales. It was thus demonstrated on a pilot plant scale for example that the process according to the invention makes it possible to produce excellent scrap products. However, at small throughputs the process according to the invention is more economically competitive with more complex manual processes, wherein for example a physicochemical separation of a scrap composition on a laboratory scale could potentially also provide pure scrap products. The great advantages of the process according to the invention are apparent in large industrial scale processes which are correspondingly particularly preferred. Very particularly preferred processes according to the invention are those wherein 30 000 kg or more, preferably 60 000 kg or more, particularly preferably 75 000 kg or more, of recycled scrap are discharged per hour. A person skilled in the art is aware that the large industrial scale implementation and in particular the specified throughputs in practice imply very particular demands on the process, the employed machines and the raw materials to be employed. This results in an increase for example in the demand for starting scraps for producing the inhomogeneous iron-containing scrap composition, with the result that the choice may be less selective, thus often increasing the inhomogeneity of the starting material.

In step a) of the process according to the invention an inhomogeneous iron-containing scrap composition is provided or directly produced in the process.

Production may in practice for example comprise mixing scrap from a plurality of iron-containing scrap fractions. This mixing may be effected for example by introducing the corresponding amounts of different scrap fractions into the comminuting unit successively or introducing them into a feed to the comminuting unit together so that they arrive in the comminuting unit simultaneously. This form of production has proven particularly efficient in practice. The production through mixing of two or more scrap fractions which is integrated into the process moreover advantageously makes it possible to control the composition of the mixture by adapting the mixing ratio. Preference is therefore given to a process according to the invention, wherein the production of the inhomogeneous, iron-containing scrap composition in step a) is effected by mixing scrap from two or more iron-containing scrap fractions, wherein the mixing is preferably effected substantially in the comminuting unit.

The term scrap fraction is clear to a person skilled in the art in the field of metal processing. A person skilled in the art can easily distinguish different iron-containing scrap fractions from one another. The scrap fractions are usually collections of congeneric substances which are assembled according to particular selection criteria and collected and/or processed together.

The composition of the different iron-containing scrap fractions may vary as a result of changing statutory regulations or industry-specific specifications. A scrap fraction consisting for example of so-called white goods, i.e. for example washing machines and ovens, is always to be distinguished by a person skilled in the art from a scrap fraction consisting for example of pressed vehicle bodies or of interplant scraps from metal-processing operations.

In accordance with the understanding of those skilled in the art an iron-containing scrap fraction is thus an ordering criterion for assembling ideally congeneric scraps which, while in most cases are in themselves likewise inhomogeneous with respect to the scrap composition, exhibit a smaller deviation in material properties of the scraps present in the scrap fraction than the scraps of a second iron-containing scrap fraction encompassing other mutually similar scraps. In practice, corresponding scrap fractions are usually collected separately in accordance with the applicable regulations and stored separately by the user.

In experiments carried out by the inventors a broad palette of customary scrap fractions was used to produce the inhomogeneous iron-containing scrap composition. Among these, certain scrap fractions are particularly advantageous on account of their good availability and relatively high iron contents. Preference is given to a preferred process according to the invention, wherein the one or more iron-containing scrap fractions are selected from the group consisting of interplant scraps, white goods, composite materials, waste incineration scraps, shredder pre-materials and end-of-life vehicles. In accordance with the understanding of those skilled in the art the term white goods is the technical term for household appliances such as refrigerators, washing machines, dishwashers or stoves and is distinguished from so-called brown goods which are consumer electronics devices such as for example televisions or mobile phones. Shredder pre-material originates for example from disposal operations or sorting plants and often comprises for example bicycles, awnings and similar articles.

For the process according to the invention the actual composition of the scrap fractions used for production/the inhomogeneous iron-containing scrap composition, i.e. the iron-containing scrap composition which is inhomogeneous especially with regard to the composition of different individual parts, is ultimately not decisive. However, in the context of the present invention the iron-containing scrap composition should be inhomogeneous since the processing of homogeneous starting materials would be significantly less demanding. This criterion is readily determinable in practice by a person skilled in the art. In accordance with the understanding of those skilled in the art an iron-containing scrap composition is in any case regarded as inhomogeneous when the iron-containing scrap composition was produced by mixing two or more iron-containing scrap fractions and/or when it comprises fractions obtained by scrapping two or more articles of different categories selected from the group consisting of household goods from the fields of white goods, vehicles and rejects from metal-processing operations.

In step b) of the process according to the invention the iron-containing scrap composition is comminuted. According to the invention this is carried out with a comminuting unit. Step b) thus corresponds for example to the step of shredding known to those skilled in the art from the prior art.

Though it is possible to employ a multiplicity of comminuting units, for example scrap shears, kondirators and zerdirators, the use of a shredder or a zerdirator has proven particularly advantageous for processing large material quantities. In the context of the present invention zerdirators are to be understood as meaning comminuting units which have a discharging region for the comminuted material, typically covered with a grate, in the bottom of the comminuting space, wherein zerdirators may however optionally also have a further discharging region in the upper part of the comminuting space. By contrast, the term shredder is to be understood as meaning comminuting units which have no discharging region for the comminuted material in the bottom of the comminuting space but where the discharging region for the comminuted material, typically covered with a grate, is arranged in the upper part of the comminuting space.

Very particular preference is given to the use of a comminuting unit according to the invention which through its construction with a movable base plate and/or cover plate makes it possible to alter the available discharging area for the particles from the comminuting space.

This makes it possible to reduce the discharging of the comminuted particles, thus making it possible to increase the average residence time of the particles in the comminuting unit. This advantageously makes it possible to control the intensity of comminution from outside, even in ongoing operation. Increasing the average residence time, which can even extend to a temporary complete blocking of the discharging region, makes it possible to achieve an increase in purification performance and/or a reduction in particle diameter and an increase in poured density as required and demanded. Explicit preference is therefore given to a process according to the invention, wherein the comminuting unit has a comminuting space having at least one discharging region for comminuted material, wherein the discharging region has movable elements arranged in it, preferably a movable base plate and/or cover plate, particularly preferably a hydraulically movable base plate and/or cover plate, which make it possible to alter the available discharging area for the particles from the comminuting space.

The inventors of the present invention have come to the conclusion that the realization of the abovementioned process mode is most advantageously achievable by the movable base plate and/or cover plate which are attached for example in the interior or on the exterior of the comminuting space, preferably on the exterior of the comminuting space. The movable elements are preferably remotely movable. In light of the foregoing preference is thus in principle given to a process according to the invention, wherein in step b) the residence time of the scrap composition in the comminuting unit, in particular the scrap residence time, is controlled to control the average particle size of the comminuted material, preferably through movable elements arranged in the discharging region.

When the comminuting unit is a shredder at least one movable element, for example a movable flap, is preferably provided at the discharging region arranged in the upper part of the comminuting space. When the comminuting unit is a zerdirator at least one movable element is preferably provided at the discharging region arranged in the bottom of the comminuting space. However, it is very particularly preferable to employ a preferred comminuting unit according to the invention which has at least one first movable element at a discharging region arranged in the upper part of the comminuting space and a second movable element at a discharging region arranged in the bottom of the comminuting space. In addition to the advantageous possibility of controlling the residence time of the scrap composition in the comminuting unit, even via two different movable elements, it is advantageously possible by moving the movable elements positioned in the lower discharging region to completely close the discharging region arranged in the bottom of the comminuting space. This advantageously makes it possible to operate the comminuting unit flexibly both as a zerdirator and as a shredder. For example, demanding scrap compositions may be comminuted in shredder mode with a closed base plate. By contrast, if a less demanding scrap composition, comprising especially metallic sheets for example, is employed, the base plate may be opened to increase throughput in zerdirator mode.

The inventors of the present invention were able to identify particularly suitable operating parameters for the comminuting unit. Preference is thus given to a process according to the invention, wherein the rotor of the comminuting unit fitted with hammers is driven by an electric motor, wherein the power output of the electric motor is preferably more than 2000 kW, particularly preferably more than 2400 kW, very particularly preferably more than 2800 kW.

Especially at high material throughputs, considerable dust evolution may occur in step b). Especially in the process mode with control of the available discharging area for the particles from the comminuting space it is possible even in continuous operation to achieve particle sizes which are regularly below those achieved in conventional processes. Dust problems are thus particularly pronounced in many cases in processes according to the invention. On the basis of their own experiments the inventors of the present invention propose providing a dedusting unit directly at the comminuting unit to avoid contamination of the environment to the best possible extent. Preference is accordingly given to a process according to the invention, wherein the comminuting unit comprises a dedusting unit, preferably a dry dedusting unit, preferably comprising one or more activated carbon filters.

In step c) a first treatment stage where organic and/or inorganic impurities are removed from the comminuted material obtained from the comminuting unit is effected. This step of separation is in principle found in some processes of the prior art where in many cases a single, comparatively simple separation apparatus constitutes the treatment.

This separation advantageously captures as many typically macroscopic impurities as possible. In accordance with the understanding of those skilled in the art step c) does not define that all impurities are separated and it is therefore an at least partial separation. Preference is given to a process according to the invention, wherein the inorganic impurities are metallic or mineral impurities, preferably metallic impurities.

Although it would be conceivable, at least in theory, to accomplish the separation in step c) manually, for example by sorting at a conveyor belt, this entails a great deal of labour for the large industrial scale scrap processing which is particularly relevant in the present case and would therefore be uneconomic at least in most industrialized nations. Preference is accordingly given to a process according to the invention wherein the separation in step c) is carried out with one or more separation apparatuses, preferably automated separation apparatuses.

The inventors of the present invention have identified among the various separation processes those which are particularly suitable for the process according to the invention. These include long-fraction separation, windsifting, magnetic separation and sieving and these are in principle likewise known per se to those skilled in the art along with the apparatuses used therefor.

To optimize the quality of the obtained scrap product the inventors of the present invention propose combining two or more of these operating steps. Preference is accordingly given to a process according to the invention, wherein the separating of organic and/or metallic impurities in step c) comprises two or more, preferably three or more, particularly preferably four or more, different operating steps that are selected from the group consisting of long-fraction separation, windsifting, magnetic separation and sieving.

In the tests carried out hitherto the inventors of the present invention have largely set aside questions of cost efficiency and concentrated on achieving a highest possible product quality of the recycled scrap to identify a particularly suitable setup for the process according to the invention and the plant according to the invention. In the opinion of the inventors preference is given to a process according to the invention, wherein the separation of organic and/or metallic impurities comprises a long-fraction separation, a windsifting, preferably with an air sifter having two or more cascades, a magnetic separation and a sieving, preferably in this sequence, wherein the magnetic separation is preferably carried out using two magnetic separators which are preferably in the form of electromagnets, wherein the field strength of the electromagnets is particularly preferably adjustable.

A special feature of the process according to the invention is that the pre-purified material obtained in step c), i.e. the comminuted material from which organic and/or inorganic impurities have already been at least partially removed, is analyzed with a first detection apparatus in step d).

At least one piece of material information, preferably two or more pieces of material information, are detected. This means that the pre-purified material is automatically examined after pre-purification. In most cases the thus-determined first material information will conductively be chosen such that it correlates with the chemical composition and/or the shape of the particles and/or the size of the particles in the pre-purified material. The material information may be for example spectroscopic measured values or acquired optical images of the pre-purified material.

Subsequently, constituents from this pre-purified material are segregated according to the detected material information in step d). This means that for example a fraction present in the pre-purified material, for which a first piece of material information which does not correspond to the predetermined criteria or specifications, for example in terms of chemical composition or shape, has been obtained, is segregated on the basis of this material information. Step d) of the process according to the invention thus represents overall a segregation assisted by a detection apparatus. The detection apparatuses employed therefor may be any detection apparatuses known to those skilled in the art, in particular spectroscopic and optical detection apparatuses.

Since the number of disruptive particles to be segregated is usually relatively low as a consequence of the preceding separation it appears easier, at least in theory, for the segregation in step d) to be accomplished manually. In this case it is conducive for the first material information to be displayed to the operators for example via a monitor or another interface, through which the operator obtains the information about which fraction of the pre-purified material to remove. However, with regard to the achievable material throughput and in particular also to the accuracy of the segregation it is explicitly preferable when the segregation is carried out in an automated fashion. The inventors have in their own plant succeeded in identifying particularly high-performance apparatuses which to this end are connected to the first detection apparatus, for example via a data processing apparatus or a network. Preference is therefore given to a process according to the invention, wherein the segregation in step d) is carried out via an automated apparatus, preferably via a compressed air gun, for example in the form of a bar having a plurality of compressed air nozzles, or a robotic arm, preferably via a robotic arm.

In the process according to the invention the material purified in this way passes through a further detection apparatus which detects at least a second piece of material information, preferably two or more pieces of material information. According to the invention this second piece of material information is compared to a material criterion assigned to the piece of material information or respectively assigned to each piece of material information. This means that for example spectroscopically determined measured values are compared to threshold values or the optically determined shape of particles is compared to a template of an accepted particle shape.

In the process according to the invention the purified material is discharged as recycled scrap, i.e. as the product of the process which may be passed to a suitable storage facility for example via conveyor belts, only when the second piece of material information meets the assigned predetermined material criterion. In the other cases the purified material is for example sent for disposal, passed into downstream plants for post-processing or recycled into the process according to the invention, wherein the latter is preferable in principle. However, for reasons of efficiency it is advantageous not to return the recyclate into the comminuting unit but rather to employ it in steps c) or d). Preference is therefore given to a process according to the invention, wherein the purified material is re-employed in step b) or step c) or step d) when the at least one second material information does not meet the predetermined material criterion.

It is preferable when the comparison is carried out by a data processing apparatus, for example a computer. Preference is accordingly also given to a process according to the invention, wherein the predetermined material criterion in the process is transmitted via a data processing apparatus and/or retrieved from a storage unit.

Preference is given to a process according to the invention, wherein the purified material is discharged as recycled scrap when all of the second pieces of material information meet the respectively assigned predetermined material criterion.

The analysis in steps d) and e) has many similarities.

For an efficient process mode in the preferred continuous or semicontinuous process it is desirable when the detection apparatuses are also continuously operated. Preference is given to a process according to the invention, wherein the analysis in step d) and/or step e), preferably in step d) and step e), is carried out continuously, in particular in an inline analysis.

To achieve the most optimal possible material constitution, in particular for simultaneous optimization of the iron content, the content of organic impurities and/or the particle shape, it has proven particularly advantageous when the first detection apparatus and/or the second detection apparatus independently of one another each detect a plurality of pieces of material information. Preference is thus given to a process according to the invention, wherein in step d) at least two, preferably at least three, first pieces of material information are detected and/or wherein in step e) at least two, preferably at least three, second pieces of material information are detected. Against this backdrop preference is also given to a process according to the invention, wherein the at least one first piece of material information and/or the at least one second piece of material information, preferably all pieces of material information, correlate with the chemical composition and/or the particle shape and/or the mechanical properties of the analyzed material, preferably with the chemical composition of the analyzed material.

For this purpose it is preferable for the large majority of the processes according to the invention when at least one of the first pieces of material information and at least one of the second pieces of material information correlate with the same material or particle property.

In the opinion of the inventors of the present invention it is particularly advantageous when the detection is carried out in spatially and/or temporally resolved fashion, which is especially dependent on the setup of the rest of the plant and the question of whether said plant is operated continuously. Such a resolution is advantageous especially in step d) since it allows more precise segregation of impurities and minimizes the rejection of material. However, such a resolution is also advantageous in step e), since a divergence from the material criterion may for example only be local, so that at least fractions of the purified material can be discharged as recycled scrap. In continuous or semicontinuous operation of the process a temporal resolution additionally allows correlation of the pieces of material information with the respectively discharged fraction of the recycled scrap. Preference is accordingly given to a process according to the invention, wherein the at least one first piece of material information and/or the at least one second piece of material information, preferably all pieces of material information, are detected with spatial and/or temporal, preferably spatial and temporal, resolution with the result that in each case a spatially and/or temporarily resolved information profile is obtained. Preference is therefore likewise given to a process according to the invention, wherein the analyzing in step d) and/or step e), preferably in step d) and step e), is carried out with spatially and temporally resolved methods of measurement.

Especially this preferred process mode synergistically makes it possible to use the determined pieces of material information, in particular the second piece of material information, simultaneously for specification, certification and qualification of the discharged recycled scrap, thus also allowing said scrap to be employed in applications placing high demands on the scrap product, especially for safety-related reasons.

Preference is therefore given to a process according to the invention, wherein the at least one first piece of material information and/or the at least one second piece of material information, preferably the at least one second piece of material information, is stored on the storage unit of a data processing apparatus, wherein the pieces of material information are preferably correlated with at least one piece of operating information, preferably a piece of temporal information, such that the respective material information may be assigned to a fraction of the recycled scrap, wherein the respective pieces of material information are preferably included with the respectively output fraction of the recycled scrap via a certificate, preferably a digital certificate.

In the course of their own experiments the inventors of the present invention were able to identify particularly suitable methods of detection/the associated corresponding detection apparatuses. These methods afforded excellent purities, wherein it has proven particularly advantageous to provide two or more methods of measurement in each case. Preference is thus given to a process according to the invention, wherein the analysis in step d) and/or step e), preferably in step d) and step e), is carried out with one or more, preferably two or more, different methods which are selected from the group consisting of X-ray fluorescence analysis, optical image recognition, preferably using artificial intelligence, and infrared (IR) absorption spectroscopy, in particular near infrared (NIR) absorption spectroscopy. X-ray fluorescence analysis is used for example for determining the elemental content and IR/NIR absorption spectroscopy is used for example for determining the organics content.

It is possible in principle to employ the same types of detection apparatuses in steps d) and e) and to detect the same measured value types as the first and second pieces of material information or to derive these from the same data types, for example images. However, the inventors of the present invention have recognized that it is advantageous to use different detection methods, especially when these can be used to detect pieces of material information that correlate with the same material or particle property. This makes it possible in synergistic fashion to minimize measurement errors and to compensate any shortcomings of the different methods among one another to achieve an even higher precision in the processing. Preference is therefore given to a process according to the invention, wherein the first and the second piece of material information are detected with different detection methods, wherein the first and the second piece of material information are preferably correlated with the same material or particle property.

As is elucidated hereinabove it may be regarded as a great advantage of the process according to the invention that excellent results may thus also be achieved in continuous operation, thus allowing a particularly time- and cost-efficient process mode. Very particular preference is therefore given to a process according to the invention, wherein the process is a continuous or semicontinuous process, wherein preferably the comminuted material and/or the pre-purified material and/or the purified material, preferably all of these materials, are at least in part conducted via conveyor belts and/or vibratory conveyors.

The process according to the invention advantageously makes it possible to obtain large amounts of recycled scrap which reproducibly exhibits particularly advantageous iron contents, form factors and/or poured densities. It is accordingly also particularly advantageous to operate the process according to the invention such that the corresponding parameters are achieved since in these cases the advantages relative to the prior art are particularly apparent.

Preference is accordingly given to a process according to the invention, wherein the recycled scrap has a maximum particle size of 100 mm or less, preferably 80 mm or less, particularly preferably 60 mm or less.

Preference is also given to a process according to the invention, wherein the recycled scrap has an average particle size in the range from 60 to 250 mm, preferably 80 to 200 mm, particularly preferably 100 to 150 mm.

Preference is likewise given to a process according to the invention, wherein the recycled scrap has an average form factor of length/width in the range from 1 to 5, preferably of 1 to 2.5, particularly preferably of 1 to 1.25, wherein the particles of the recycled scrap are very particularly preferably substantially spherical.

Preference is especially given to a process according to the invention, wherein the recycled scrap has a poured density of 1.0 $t/m^3$ or more, preferably 1.2 $t/m^3$ or more, particularly preferably 1.5 $t/m^3$ or more.

Preference is further given to a process according to the invention, wherein the recycled scrap has an iron content of 97% or more, preferably 98% or more, particularly preferably 99% or more, based on the mass of the recycled scrap.

Starting from the process according to the invention the inventors of the present invention have additionally identified a particularly advantageous development which is in synergistic interaction with the setup of the process according to the invention. What are concerned here are up to three so-called feedbacks which can be used to control and optimize the process.

The first two feedbacks employ the pieces of material information that are in any case detected during processing of the scrap in the process according to the invention in order also to control the individual steps of the process according to the invention according to the recorded pieces of material information.

Preference is given to a process according to the invention having a so-called first feedback, wherein the composition of the inhomogeneous iron-containing scrap composition is controlled according to the first material information and/or the second piece of material information, preferably the first piece of material information and the second piece of material information, particularly preferably by altering the relative mass ratio of two or more iron-containing scrap fractions in the inhomogeneous iron-containing scrap composition.

This process mode makes it possible to actively react to divergences in the constitution of the scrap, in particular of the chemical composition, and to actively control the selection of the starting materials in the upstream portion of the process. This is preferably done using a data processing apparatus which preferably comprises a neural network or a comparable artificial intelligence, preferably a neural network, which is trained to react to registered divergences of the pieces of material information from the corresponding predetermined target values, in particular the material criterion, with an alteration of the relative mass ratio of two or more iron-containing scrap fractions in the production of the inhomogeneous iron-containing scrap composition that is suitable for correcting the determined divergence. Since the first pieces of material information are detected earlier in the process it may be advantageous, as a consequence of the then faster reaction of the process, to undertake this first feedback on the basis of the first piece of material information.

Preference is given to a process according to the invention having a so-called second feedback, wherein the comminution in step b) is controlled according to the first piece of material information and/or the second piece of material information, preferably the first piece of material information and the second piece of material information, wherein preferably one or more operating parameters of the comminuting unit selected from the group consisting of the size of the comminuting space, the size of the discharging area available in the discharging region and the speed of the rotor fitted with hammers are altered. Even if the basic idea is comparable to that of the first feedback, the second feedback does not control the composition of the inhomogeneous iron-containing scrap composition according to the detected pieces of material information but rather controls the operating parameters of the comminuting unit, wherein the size of the particle outlet is the preferred manipulated variable. This feedback may be employed particularly efficiently when the process according to the invention is operated with the comminuting unit according to the invention. The control of step b) is also preferably effected using a data processing apparatus which preferably comprises a neural network or a comparable artificial intelligence, preferably a neural network, which is trained to react to registered divergences of the pieces of material information from the corresponding predetermined target values, in particular the material criterion, with an alteration of the operating parameters of the comminuting unit that is suitable for correcting the determined divergence.

The remaining third feedback makes use of pieces of material information that are detected not in the process according to the invention but rather in the course of further processing, wherein the same elucidations made hereinabove for the detection of the first and second pieces of material information in principle apply. These are detected on a product, for example a composition or a conversion product, obtained by processing the recycled scrap and may relate for example to the material composition or strength. The at least one third piece of material information will thus regularly be provided to the operator using the process according to the invention from external sources, for example from customers receiving cool scrap for use in a converter.

Preference is given to a process according to the invention comprising a so-called third feedback, wherein at least a third piece of material information is detected during the further processing of the recycled scrap, wherein the composition of the inhomogeneous, iron-containing scrap composition, preferably the relative mass ratio of the iron-containing scrap fractions in the inhomogeneous iron-containing scrap composition, preferably as described as preferred hereinabove, and/or the comminution in step b), preferably as described as preferred hereinabove, and/or the separation in step c) are controlled according to the at least one third piece of material information. The use of a neural network or a comparable artificial intelligence, preferably a neural network, is advantageous here too.

It is preferable when the process according to the invention comprises at least the first and the second feedback, particularly preferably the first, the second and third feedback.

The invention additionally relates to a recycled scrap produced or producible by the process according to the invention, wherein the proportion of iron in the recycled scrap is 97% by weight or more, preferably 98% by weight or more, particularly preferably 99% by weight or more, based on the mass of the recycled scrap. Corresponding recycled scrap according to the invention is particularly advantageous because it is suitable also for demanding applications and in terms of its quality is virtually equal to newly produced metals.

The invention further relates to a plant for recycling scrap, preferably for performing the process according to the invention, comprising:
- at least one comminuting unit for comminuting an inhomogeneous, iron-containing scrap composition, preferably a comminuting unit according to the invention,
- means for separating organic and/or metallic impurities from the comminuted material,
- one or more first detection apparatuses for analyzing the material obtained after separation to detect a first piece of material information,
- means for automated segregation of fractions from the material obtained after separation according to the first piece of material information,
- one or more second detection apparatuses for analyzing the material obtained after segregation to detect a second piece of material information,
- a data processing apparatus adapted for comparing the second piece of material information with an assigned predetermined material criterion and discharging the material purified in the apparatus as recycled scrap when the second piece of material information meets the assigned predetermined material criterion.

The plant according to the invention is advantageous because it is suitable for performing the process according to the invention. Particular preference is given to plants according to the invention comprising additional constituents required for performing the process according to the invention in preferred embodiments, in particular specific comminuting units, separation apparatuses and detection apparatuses and also data processing apparatuses adapted for realizing the above-described first, second and/or third feedback.

The invention finally relates to a comminuting unit, preferably for use in a process according to the invention or a plant according to the invention, comprising:
- a comminuting space having at least one discharging region for comminuted material and
- at least one rotor fitted with hammers arranged in the comminuting space, wherein the comminuting unit comprises a movable element adapted for controlling the discharging area for the comminuted material from the comminuting space which is available in the discharging region.

wherein the comminuting unit preferably has a movable base plate and/or cover plate, particularly preferably a hydraulically movable base plate and/or cover plate with which the discharging area for the comminuted particles from the comminuting space which is available in the discharging region may be altered.

In accordance with the understanding of those skilled in the art the comminuting space will generally comprise an inlet opening through which the scrap composition to be processed can be introduced into the comminuting space and which is not a discharging region for comminuted material in the context of the present invention.

This comminuting unit according to the invention is preferable because it is optimized for use in the process according to the invention and allows in particular the above-described control of process step b) and the second feedback to be realized particularly readily. Compared to the prior art the comminuting unit according to the invention is capable of influencing the average residence time of the particles in the comminuting space even during operation and thus for example of influencing the particle size and the degree of purification of the processed scrap.

Especially preferred is a comminuting unit according to the invention wherein the comminuting unit in the upper part of the comminuting space has a first discharging region having a first movable element which is adapted for controlling the discharging area for the comminuted material from the comminuting space which is available in the first discharging region and wherein the comminuting unit in the bottom of the comminuting space has a second discharging region having a second movable element which is adapted for controlling the discharging area for the comminuted material from the comminuting space which is available in the second discharging region. This comminuting unit according to the invention is particularly preferred because—for the first time to the knowledge of the inventors—it makes it possible to obtain a comminuting unit which may be flexibly, i.e. for example also in operation, switched between a shredder and a zerdirator. Particular preference is thus given to a comminuting unit according to the invention which, by moving one or more elements in the discharging region of the comminuting space, may be operated as a shredder and as a zerdirator.

Very particular preference is given to a process according to the invention which combines one or more features of the abovementioned preferred processes, wherein the comminuting unit comprises an acoustic enclosure.

Very particular preference is given to a process according to the invention which combines one or more features of the abovementioned preferred processes, wherein the comminuting unit is anchored in the ground by means of a foundation.

Very particular preference is given to a process according to the invention which combines one or more features of the abovementioned preferred processes, wherein the scrap composition and/or the comminuted material and/or the pre-purified material and/or the purified material are weighed.

Very particular preference is given to a process according to the invention which combines one or more features of the abovementioned preferred processes, wherein the process is controlled via a control unit.

Very particular preference is given to a process according to the invention which combines one or more features of the abovementioned preferred processes, wherein in case of faults an acoustic or optical warning signal is emitted.

Very particular preference is given to a process according to the invention which combines one or more features of the abovementioned preferred processes, wherein the comminuting unit is made of steel to an extent of more than 75% by weight.

Very particular preference is given to a process according to the invention which combines one or more features of the abovementioned preferred processes, wherein the discharged recycled scrap is stored in a repository.

Very particular preference is given to a process according to the invention which combines one or more features of the abovementioned preferred processes, wherein the discharged recycled scrap is transported away on a heavy goods vehicle, a goods train or a ship, preferably with a goods train or a ship.

Very particular preference is given to a process according to the invention which combines one or more features of the abovementioned preferred processes, wherein the process can be interrupted via an emergency switch.

Very particular preference is given to a plant according to the invention which combines one or more features of the abovementioned preferred plants, wherein the plant comprises a signalling and/or warning apparatus.

Very particular preference is given to a plant according to the invention which combines one or more features of the abovementioned preferred plants, wherein the plant comprises an emergency switch to stop the plant.

Very particular preference is given to a process according to the invention which combines one or more features of the abovementioned preferred plants, wherein the comminuting unit is made of steel to an extent of more than 75% by weight.

Very particular preference is given to a plant according to the invention which combines one or more features of the abovementioned preferred plants, wherein the plant comprises a control unit to control the plant.

Very particular preference is given to a plant according to the invention which combines one or more features of the abovementioned preferred plants, wherein the plant comprises an overall length of more than 5 m, preferably more than 10 m, particularly preferably more than 15 m.

Very particular preference is given to a comminuting unit according to the invention which combines one or more features of the abovementioned preferred comminuting units, wherein the comminuting unit has a foundation, preferably a concrete foundation.

Very particular preference is given to a comminuting unit according to the invention which combines one or more features of the abovementioned preferred comminuting units, wherein the comminuting unit comprises hammers made of steel.

Very particular preference is given to a comminuting unit according to the invention which combines one or more features of the abovementioned preferred comminuting units, wherein the comminuting unit comprises an operating means.

Very particular preference is given to a comminuting unit according to the invention which combines one or more features of the abovementioned preferred comminuting units, wherein the comminuting unit has a weight of more than 100 kg, preferably more than 200 kg.

Very particular preference is given to a comminuting unit according to the invention which combines one or more features of the abovementioned preferred comminuting units, wherein the comminuting unit is made of steel to an extent of more than 75% by weight.

Elucidated hereinbelow are the process according to the invention and the plant according to the invention used therefor in the preferred embodiment identified as particularly advantageous by the inventors of the present invention in the course of comprehensive optimization which makes it possible to produce recycled scrap on a large industrial scale which, while virtually completely free from organics, has an iron content of more than 97% as well as poured densities of about 1.5 t/m$^3$ with approximately spherical particles, i.e. a form factor of about 1, and a maximum particle size of about 80 mm.

The process is operated as a continuous process, wherein the processed material is conveyed via conveyor belts.

The produced starting material is an inhomogeneous iron-containing scrap composition. Production is carried out in the feed of a comminuting unit by mixing scrap from a plurality of iron-containing scrap fractions, namely white goods, interplant scraps, shredder pre-materials and pressed end-of-life vehicles.

The inhomogeneous iron-containing scrap composition is comminuted in an inventive comminuting unit according to FIG. 1 which has a hydraulically movable base plate and cover plate with which the available discharging area of the comminuted material from the comminuting space may be altered. This makes it possible to control the average residence time of the particles in the comminuting space and the average particle size of the comminuted material. The movable base plate arranged in the bottom of the comminuting space allows the lower discharging reason to be closed so that only the discharging region arranged in the upper part of the comminuting space remains. This allows the comminuting unit according to the invention to be operated as a shredder and as a zerdirator. The comminuting unit is usually operated as a shredder in the performed experiments.

The comminuting unit additionally has a dry dedusting unit comprising a plurality of activated carbon filters.

The shredded material is passed through a separation assembly to separate organic and inorganic impurities from the comminuted material and to obtain a pre-purified material.

The separation assembly comprises in a serial arrangement a customary long-fraction separation, a wind sifter with three cascades, two magnetic separators with adjustable electromagnets for magnetic separation and a sieve.

The material stream is analyzed with two first detection apparatuses. A camera detects pieces of material information relating to the shape and size of the fractions in the pre-purified material and a continuously operating NIR spectrometer determines measured values that correlate with the chemical composition of the analyzed material as a piece of material information. These spatially and temporally resolved pieces of material information are passed by computer control to a robotic sorter which on the basis of the provided data segregates identified impurities/fractions which do not meet predetermined requirements in the context of the sensor-assisted sorting.

The purified material on the conveyor belt is subsequently passed through a further region in which it is reanalyzed. Employable detection apparatuses here again include a continuously operating NIR spectrometer and in addition an X-ray fluorescence spectrometer, wherein the latter provides complementary information regarding chemical composition (rechecking of the dimensions of the particles, for example with a camera, is not carried out in the present process but may be provided for). The thus-recorded pieces of material information are compared using a data processing apparatus with assigned predetermined material criteria which in the present case are directed to the presence of selected organic and metallic impurities, in particular copper.

If all material criteria were met the obtained material was discharged as recycled scrap and passed to a storage repository via a conveyor belt.

The detected second pieces of material information are stored on a computer and related to the time of production/time of discharging. These pieces of material information are related to the corresponding batch via a digital certificate which can be made available to the customer in later use and which allows qualification of the scrap product for certain applications.

The corresponding plant is provided with a computer control means which allows implementation of different feedbacks, i.e. control of the process according to the detected material properties. In this embodiment the operating parameters of the comminuting unit, more precisely the output and the adjustment of the movable plates in the discharging region, were controlled according to the first piece of material information detected by the camera. The change in the composition of the inhomogeneous iron-containing scrap composition was carried out according to the NIR measurements/X-ray fluorescence measurement. At the current stage of development, this adaptation is made by means of a visual instruction to an excavator operator which is indicated to the operator via a display and indicates the amounts of the scrap fractions that should be introduced. However, automated feeding is the solution that is sought.

The process and the plant are adapted for receiving a third piece of material information from a user of the recycled material and as a consequence of this third piece of material information for controlling the operating parameters of the comminuting unit and the composition of the inhomogeneous iron-containing scrap composition. Although the absence of a real user means that this feedback can presently only be tested with notional empirical data, the adapting of the plant works in accordance with the invention.

The continuous detection of pieces of material information, the control of the process derived therefrom and the subsequent detection of the effect by the same detection means advantageously make it possible to obtain comprehensive data sets which allow training of a neural network to make the feedbacks even more precise and to reduce the need for specialist empirical knowledge to the greatest possible extent.

The inventive comminuting unit and the preferred embodiments thereof are more particularly elucidated and described below with reference to the accompanying FIGURE.

FIG. 1 shows a schematic cross-sectional representation of an inventive comminuting unit in a particularly preferred embodiment.

FIG. 1 shows by way of example a schematic cross-sectional representation of a preferred inventive comminuting unit 10.

The comminuting unit 10 is especially suitable for use in a process according to the invention/in a plant according to the invention and comprises a comminuting space 12.

The comminuting space 12 comprises an inlet opening 22 through which the scrap composition, supplied for example via a conveyor belt 18a, may be introduced into the comminuting space 12. The comminuting space 12 additionally comprises two discharging regions 14a, 14b.

The first discharging region 14a is arranged in the upper part of the comminuting space 12 and comprises a first movable element 20a which is adapted for limiting the discharging area of the comminuted material from the comminuting space 12 which is available in the discharging region 14a. The first movable element 20a is in the present case configured as a hydraulically adjustable cover plate.

The second discharging region 14b is arranged in the bottom of the comminuting space 12 and comprises a second movable element 20b which is adapted for limiting the discharging area of the comminuted material from the comminuting space 12 which is available in the discharging region 14b. The second movable element 20b is in the present case configured as a hydraulically adjustable base plate which is configured in two parts in the form of a flap having two wings.

In FIG. 1 the movability of the movable elements 20a, 20b is indicated by double arrows. The discharging regions 14a, 14b are each covered by grates which prevent escape of excessively large particles from the comminuting space 12. The grates in the discharging regions 14a, 14b may preferably have adjustable mesh sizes and/or be reversibly and nondestructively replaceable.

In the comminuting space 12 the scrap composition is comminuted by the rotor 16 fitted with hammers. After a certain residence time in the comminuting space 12 the comminuted particles are discharged from the comminuting unit 10 through one of the discharging regions 14a, 14b and may for example be sent for further processing via conveyor belts 18b, 18c.

Controlling the movable elements 20a, 20b makes it possible to control the average residence time of the particles in the comminuting space 12. The second movable element 20b additionally allows the second discharging region 14b to be completely closed so that the comminuting unit 10 may be switched from zerdirator operation to shredder operation.

REFERENCE NUMERALS

10
Comminuting unit
12
Comminuting space
14a-b
Discharging region
16
Rotor
18a-c
Conveyor belt
20a-b
Movable element
22
Inlet opening

The invention claimed is:

1. A process for producing recycled scrap comprising the steps of:
   a) providing an inhomogeneous, iron-containing scrap composition,
   b) comminuting the inhomogeneous, iron-containing scrap composition in a comminution unit to obtain a comminuted material,
   c) separating one or more of organic and inorganic impurities from the comminuted material to obtain a pre-purified material,
   d) analyzing the pre-purified material with one or more first detection apparatuses to detect at least one first material information and segregating constituents of the prepurified material to obtain a purified material, wherein the segregating is carried out according to the first material information and
   e) analyzing the purified material with one or more second detection apparatuses to detect at least a second material information,
   f) comparing the detected second material information with a predetermined material criterion assigned to the second material information,
   wherein the purified material is discharged as the recycled scrap when the second material information meets the assigned predetermined material criterion.

2. The process according to claim 1, wherein the separating of one or more organic and inorganic impurities in step c) comprises two or more different operating steps selected from the group consisting of long fraction separation, windsifting, magnetic separation and sieving.

3. The process according to claim 1, wherein the segregating in step d) is carried out by an automated apparatus.

4. The process according to claim 1, wherein at least one of:
   one or more of the at least one first material information and the at least one second material information, are detected with one or more of a spatial and temporal resolution to obtain one or more of a spatially and temporally resolved information profile respectively, and
   the analyzing in one or more of step d) and step e) is carried out by one or more different methods selected from the group consisting of X-ray fluorescence analysis, optical image recognition, artificial intelligence, infrared (IR) absorption spectroscopy, and near infrared (NIR) absorption spectroscopy.

5. The process according to claim 1, wherein a composition of the inhomogeneous iron-containing scrap composition is controlled according to one or more of the first material information and the second material information.

6. The process according to claim 1, wherein the comminuting in step b) is controlled according to one or more of the first material information and the second material information.

7. The process according to claim 1, wherein in a further processing of the recycled scrap at least a third material information is detected, wherein one or more of a composition of the inhomogeneous iron-containing scrap composition, the comminuting in step b), and the separating in step c) is controlled according to the at least third material information.

8. The process according to claim 1, wherein the process is a continuous or semicontinuous process.

9. A plant for recycling scrap, the plant comprising:
   at least one comminuting unit for comminuting an inhomogeneous, iron-containing scrap composition to obtain a comminuted material,
   means for separating one or more of organic and inorganic impurities from the comminuted material to obtain a pre-purified material,
   one or more first detection apparatuses for analyzing the pre-purified material to detect at least one first material information,
   means for automated segregation of constituents of the prepurified material to obtain a purified material, wherein the segregating is carried out according to the first material information,
   one or more second detection apparatuses for analyzing the purified material to detect at least a second material information and
   a data processing apparatus adapted for comparing the second material information with an assigned predetermined material criterion and discharging the material purified in the plant as recycled scrap when the second material information meets the assigned predetermined material criterion.

* * * * *